UNITED STATES PATENT OFFICE.

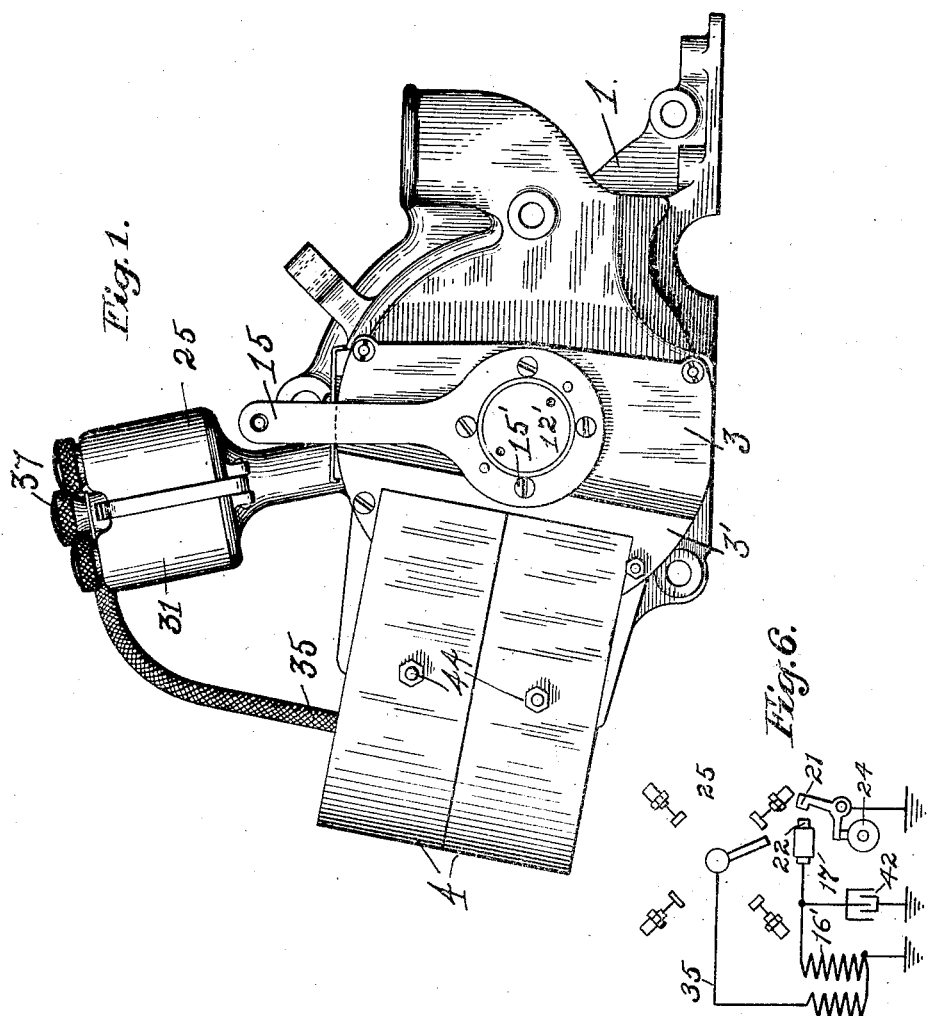

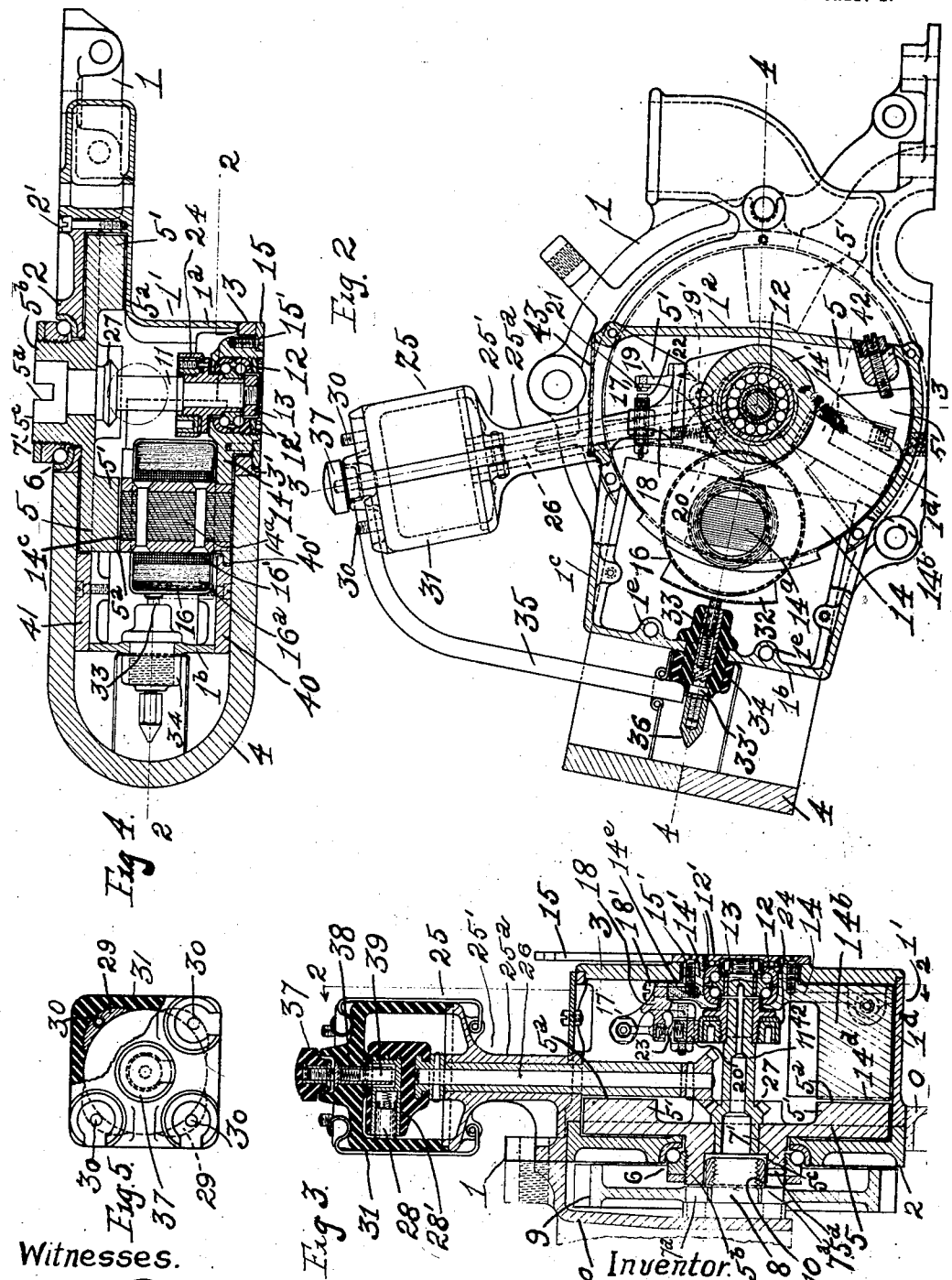

LEON J. LE PONTOIS, OF LAKEWOOD, OHIO, ASSIGNOR, BY MESNE ASSIGNMENTS, TO THE TEAGLE COMPANY, OF CLEVELAND, OHIO, A CORPORATION OF OHIO.

ELECTRIC GENERATOR.

1,330,037.   Specification of Letters Patent.   Patented Feb. 3, 1920.

Application filed October 14, 1914, Serial No. 866,605. Renewed April 23, 1919. Serial No. 292,242.

*To all whom it may concern:*

Be it known that I, LEON J. LE PONTOIS, a citizen of the Republic of France, residing at Lakewood, in the county of Cuyahoga and State of Ohio, have invented certain new and useful Improvements in and Relating to Electric Generators, of which the following is a specification.

This invention relates to apparatus for generating electric current impulses for ignition purposes, more particularly high tension electrical impulses.

One of its principal objects is to incorporate in a motor, for example like the one used in the well known Ford automobile, Model T type, a self contained, high tension magneto, in such manner that the engine case and magneto together form a unitary structure, each being a component part of the other.

I am aware of the fact that it has been proposed to attach to the crank case of a Ford motor of this type, a standard form of magneto, which, as a unit in itself, may be mounted upon or removed from the engine casing by merely connecting the magneto to or disconnecting it from the engine casing, in some instances a new end plate being supplied for the purpose. My idea, however, is to build, so to speak, a high tension generator into the Ford motor and by so doing to economize space and weight, reduce the number of parts involved, and have an electrical generator especially designed for the Ford motor and incorporated in the structure as a component part thereof.

Another object of my invention has been to provide for this type of motor a self contained high tension magneto which will be accurately timed to the motor without addition of any gearing other than that already present in the motor, namely the gearing between the cam and the crank shafts, thereby avoiding the multiplicity of gears employed in attaching standard magnetos to the Ford motor with incident lost motion in the gearing and consequent undesirable effects upon the timing. In fact, I have sought to incorporate a self contained high tension generator in the Ford motor in such manner as to insure most accurate ignition timing, synchronous generation of the ignition sparks and substantial consonance in firing of the various cylinders.

Other objects of my invention will be obvious to those skilled in the art from the description of a construction embodying it, which I have selected for the purpose of illustration herein.

Figure 1 is a front elevation of an end plate for the front end of a crank case of a Ford motor having combined therewith electric generating mechanism embodying my invention.

Fig. 2 is a section on the line 2—2 of Figs. 3 and 4, of the mechanism illustrated in Fig. 1.

Fig. 3 is a section on the line 3—3 of Fig. 2, a portion of the crank case and engine gearing being shown in section.

Fig. 4 is a section on the line 4—4 of Fig. 2.

Fig. 5 is a view partly in elevation and partly in section of the distributer mechanism.

Fig. 6 is a wiring diagram.

In the drawings, 1 indicates an end plate. The one illustrated is particularly adapted to close the front end of the crank case O of a Ford motor of the type in question. In the embodiment of my invention shown in the drawings, this end plate is of non-magnetic material. 2 is a bearing plate of iron set in a recess in the end plate 1 and secured in position by screws 2', but one of which is shown. The end plate 1 has a forwardly extending boxlike section, 1' having side walls 1ª, 1ᵇ and top and bottom walls 1ᶜ, 1ᵈ. Within this section of the end plate are arranged the generating winding and circuit opening and closing mechanism hereinafter described.

3 is an endplate for the box-like section 1'. It is removably secured to the walls 1ª, 1ᶜ and 1ᵈ and may be made of iron. 4 are permanent magnets, preferably of the horseshoe type, which straddle the section 1' of the end plate 1 and have their polar extremities engaging respectively with the iron plates 2 and 3'. 5 is an unwound rotor made of iron and having a plurality of polar projections 5', each of which has a polar surface 5ª disposed in a plane at right angles to the axis of the rotor.

The rotor has a rearwardly extending hub 5ᵇ which is mounted in an anti-friction bearing 6 carried by the plate 2. This bearing may be constructed to take load as well as thrust. The hub 5ᵇ is recessed at 5ᶜ and notched at 5ᵈ to form one element 7' of a clutch, the other element of which 7ᵃ is either one or both of the forwardly extending pins carried by timing gear 9, secured to the cam shaft 8, as shown in Fig. 3. The front end of the Ford cam shaft may, as indicated, be cut off adjacent the nut 10 thereon which positions the gear 9. Extending forwardly from the rotor 5 and secured thereto is the co-axially arranged shaft 11, made preferably of non-magnetic metal or metal of low magnetic permeability. At its front end this shaft is mounted in an anti-friction bearing 12 constructed preferably to take thrust in both directions, one section of this bearing being held in position by a nut 13 on the end of the shaft 11.

14 is a stator made of iron and having a hub 14' mounted to oscillate in the plate 3. The stator carries a plurality of polar projections. In the drawings two such projections are shown. The one marked 14ᵃ is laminated, while the by-pass marked 14ᵇ is not shown to be laminated. The polar faces 14ᶜ and 14ᵈ, respectively, of these polar projections are disposed in a plane preferably as closely adjacent to the parallel plane of the polar surfaces of the rotor as manufacturing expediency will permit, so as to insure relatively narrow air gaps between these coöperating parts. 15 is an operating lever for the stator suitably secured thereto as by means of screws 15'.

The double thrust bearing 12 is positioned in a recess provided therefor in the hub of the stator and is secured in position by suitable nuts 12'.

16 indicates as an entirety a generating winding. The one illustrated comprises a section 16' of relatively coarse wire, the primary winding, and a section 16ᵃ of relatively fine winding, the secondary winding, carried by the stator and surrounding the laminated polar projection 14ᵃ.

17 indicates a suitable mechanism for opening and closing the primary circuit of the generating winding. It consists of a frame 18 detachably secured to an upwardly extending projection 14ᵉ on the stator by means of a screw 18'. 19 is a breaker arm pivotally secured intermediate its ends at 19' to the frame 18. At one end it carries a cam engaging shoe 20 and at its other end a movable breaker electrode 21. 22 is a relatively stationary breaker electrode, adjustably mounted in a projection on the frame 18. 23 is a spring seated at one end in the frame 18 and at its other end in the adjacent end of the breaker arm 19 and adapted normally to press the said arm so as to effect engagement between the electrodes 21 and 22. 24 is a cam suitably secured to the shaft 11 so as to rotate therewith and from time to time permit the engagement and effect the disengagement of the breaker electrodes in a well known manner.

Any suitable distributer mechanism may be employed.

I indicate one at 25. 25' is a support extending upwardly from and carried by the end plate 1 and having a tubular section 25ᵃ through which extends the distributer shaft 26 which is geared at its lower end to the shaft 11 by means of miter gears 27. At its upper end the distributer shaft carries the distributer brush 28 which is suitably insulated and is adapted to coöperate with the distributer segments 29 each of which is connected with one of the distributer terminals 30 and is in turn carried by a suitable distributer cap piece 31 of insulating material. Electrical connection between the high tension winding 16ᵃ and the distributer brush 28 is effected through the instrumentality of a high tension segment 32 electrically connected to one terminal of the high tension winding 16ᵃ so as to swing with said winding about the axis of the stator, a suitable brush and socket connection 33 carried by the insulating plug 34 in the wall 1ᵇ; an insulated electrical conductor 35 electrically connected at one end to the terminal piece 33' as by nut 36, and at its upper end by the insulated nut 37 to the socket piece 38 which has electrical connection through the brush 39 with the socket 28' for the brush 28.

The space between the nut 36 and the adjacent wall of the permanent magnets may be utilized as a safety spark gap.

In order to collect as much of the magnetic flux as possible and direct it through the coil, I have provided flux collecting plates 40, 41, each of which is arranged in contact with the inner surface of one of the magnet legs and is held in position in any suitable manner as by screws, fitted into inwardly extending lugs carried by the walls 1ᶜ and 1ᵈ, respectively. The magnets 4 are held in position by bolts 44 extending through openings in lugs 1ᵉ in the wall 1ᵇ.

In order to provide against the polar surface 14ᶜ of the stator being drawn into engagement with the polar surface of the rotor, the collector plate 40 and adjacent wall of the stator may be rabbeted as indicated at 40'.

42 is a condenser carried by the stator, preferably adjacent the by-pass 14ᵇ thereof. This condenser is connected in parallel with the electrodes 21 and 22.

43 is a cover plate for an opening in the box like extension 1', adapted to permit ready access to the breaker mechanism.

In operation the cam 24 is shaped and positioned so as to insure the closing of the primary circuit through the electrodes 21 and 22, each time that one of the polar surfaces 5ᵃ of the rotor is moving away from the polar surface 14ᶜ of the stator, and a current is induced in the primary winding due to flux decrease therethrough. When the rate of flux decrease has practically reached a maximum, the cam opens the primary circuit by separating the electrodes 21 and 22, causing an electromotive force to be generated in the secondary winding of sufficient value to break down the dielectric between the terminals of the spark plug in the engine cylinder and an igniting spark to jump therebetween in the well known manner.

In the mechanism illustrated in the drawings, the stator carries the breaker apparatus, generating winding and condenser and is oscillatable about the axis of the rotor so as to vary the time of generation of the igniting sparks, and to insure that the sparks will have the same value at any place throughout the range of the mechanism between the limits of full advance and full retard, for any given speed of rotation.

With a high speed, light weight motor of the Ford type in question, I have found it to be most advantageous in the actual operation of the motor vehicle to have under different operating conditions as to load and speed, full value of igniting current throughout the full range of adjustment.

The Ford cam shaft runs at one half crank shaft speed. Accordingly, four igniting impulses are necessary for each revolution of the cam shaft, and it will be noted that the rotor is provided with 4 polar projections having polar faces 5ª, and that the cam 24 closes and opens the primary circuit four times during each revolution.

In order to install a generator embodying my invention, upon a Ford car, all that is necessary is to remove the end plate for the upper half of the crank case, cut off the end of the Ford cam shaft adjacent the nut 10, and then put one of the constructions herein illustrated in the place of the end plate removed, causing the pins 7ª on the cam shaft gear 9 to enter the notches 5ᵈ in the rotor hub. This will insure proper timing of the rotor and cam relative to the cam shaft, and the only possibility of error in timing may arise in carrying the terminal leads from the distributer to the cylinders, that is in getting number 1 and number 4 and number 2 and number 3 cylinders connected wrong by 180 degrees, whereupon by changing the terminal leads between 1 and 4 and between 2 and 3, respectively, the timing will become proper. No adjustment or other alteration will be found necessary. It will be noted that a construction embodying my invention becomes a component part of the Ford crank case and that no gears are added in order to properly operate the apparatus.

The rotor is mounted independently of the Ford cam shaft and the connection between it and the Ford cam shaft through the instrumentality of the pins on the timing gear is substantially universal in nature, not requiring close fit. The timing is accurate, the generation of firing impulses synchronous, and all the parts are correlated so as to coöperate in a durable and efficient manner.

To those skilled in the art of making mechanism of the class described, many alterations in construction and widely differing embodiments and applications of my invention will suggest themselves, without departing from the spirit and scope thereof.

My disclosures and the description herein are purely illustrative, and are not intended to be in any sense limiting.

What I claim is:

1. In combination, a section of an engine casing having a cut-away portion, a field magnet having one leg thereof forming an insert for said cut-away portion, a rotor mounted in said section and having polar surfaces rotatable between the poles of said field magnet, a stator interposed between said rotor and one of said magnet poles and having a plurality of polar projections, and a generating winding on one of said polar projections.

2. In combination, a U-shaped field magnet, a stator arranged between the legs of said magnet, adjacent one of the poles of the magnet, and having a plurality of polar projections extending in the direction of the other pole of said magnet, a generating winding in inductive relation to one of said polar projections on said stator, and a rotor having a plurality of polar faces adapted to pass between the last mentioned pole of said magnet and the polar surfaces of said polar projections on the stator and thereby establish paths of least magnetic reluctance first through and then outside of said generating winding.

3. In combination, a U-shaped field magnet, a support extending from one leg thereof, a rotor mounted in said support on an axis at right angles to the legs of said magnet and having a plurality of polar faces arranged in a plane parallel to the legs of said magnet and adapted to be rotated between the poles of the magnet, a stator arranged between the plane of the polar faces of said rotor and one of said magnet poles and having a plurality of polar projections, and a generating winding in inductive relation to one of said polar projections, the polar faces of said rotor and said polar projections being shaped and disposed alternately to establish, during the operation of said rotor, a path for the flux between said poles first through and then outside said generating winding.

4. In combination, a U-shaped field magnet, a support extending from one leg thereof, a rotor mounted in said support on an axis at right angles to the legs of said magnet and having a plurality of polar faces arranged in a plane parallel to the legs of said magnet and adapted to be rotated between the poles of the magnet, a stator arranged between the plane of the polar faces of said rotor and one of said magnet poles, and having a plurality of polar projections, a generating winding in inductive relation to one of said polar projections and means for effecting relative angular adjustment between the field magnet and the stator during the operation of the rotor.

5. In combination, a U-shaped field magnet, a support extending from one leg thereof, a rotor mounted in said support on an axis at right angles to the legs of said magnet and having a plurality of polar faces arranged in a plane parallel to the legs of said magnet and adapted to be rotated between the poles of the magnet, a stator arranged between the plane of the polar faces of said rotor and one of said magnet poles and having a plurality of polar projections, a generating winding in inductive relation to one of said polar projections, a breaker mechanism supported on said stator, a shaft extending outwardly from said rotor, and a cam on said shaft for operating said breaker mechanism.

6. In combination, a support comprising a pair of iron end plates and a box-like section of non-magnetic material supporting and spacing said end plates, a rotor mounted in one of said end plates and a stator carried by the other end plate, both said rotor and stator having polar projections with coöperating polar faces arranged in planes at right angles to the axis of said rotor, a generating winding on said stator, and a magnet embracing said box-like section and having each of its legs engaging with the adjacent end plate.

7. In combination, a section of an engine casing, an unwound rotor and a stator, each having a plurality of polar projections and each supported by and removable with said section of the engine casing, a generating winding on said stator and a permanent magnet having its poles in inductive relation to said rotor and stator.

8. In combination, a support comprising a pair of parallel sections of iron separated by a box-like section of non-magnetic material, one of said iron sections having a plurality of inwardly extending polar projections with polar surfaces in a common plane, a rotor mounted in the other section and having polar surfaces arranged to coöperate with the polar surfaces of said polar projections, a generating winding on one of said polar projections, and a field magnet embracing said box-like section and having each of its polar extremities in engagement with the adjacent iron section.

9. In combination, an end plate for the crank case of an engine, a cam shaft mounted independently of said end plate, a rotor mounted in said end plate and provided with a plurality of polar projections having polar faces in a plane at right angles to the axis of said cam shaft, said rotor having driving connection with said cam shaft, a stator supported from said end plate and having a plurality of polar projections with polar faces disposed to coöperate with the polar surfaces of the polar projections on said rotor, a generating winding on one of the polar projections on said stator, and a field magnet having one of its poles adjacent to one surface of said rotor and its other pole adjacent to the opposite surface of said stator.

10. In combination, an end plate for the crank case of an engine, a cam shaft mounted independently of said end plate, a rotor mounted in said end plate and provided with a plurality of polar projections having polar faces in a plane at right angles to the axis of said cam shaft, said rotor having driving connection with said cam shaft, a stator supported from said end plate and having a plurality of polar projections with polar faces disposed to coöperate with the polar surfaces of the polar projections on said rotor, a generating winding on one of the polar projections on said stator, a field magnet having one of its poles adjacent to one surface of said rotor and its other pole adjacent to the opposite surface of said stator, and means for causing relative angular movement between said rotor and stator during the rotation of said rotor.

11. In combination, an end plate for the crank case of an engine, a cam shaft mounted independently of said end plate, a rotor mounted in said end plate and provided with a plurality of polar projections having polar faces in a plane at right angles to the axis of said cam shaft, a stator supported from said end plate and having a plurality of polar projections with polar faces disposed to coöperate with the polar surfaces of the polar projections on said rotor, a generating winding on one of the polar projections on said stator, a field magnet having one of its poles adjacent to one surface of said rotor and its other pole adjacent to the opposite surface of said stator, a gear for driving said cam shaft, and a driving connection between said gear and said rotor.

12. In combination, a support comprising a pair of parallel sections of iron separated by a box-like section of non-magnetic material, one of said iron sections having a plurality of inwardly extending polar projections with polar surfaces in a common plane, a rotor mounted in the other section and having polar surfaces arranged to coöperate with the polar surfaces of said polar projections, a generating winding on one of said polar projections, a field magnet embracing said box-like section and having each of its polar extremities in engagement with the adjacent iron section, a distributer supported by said box-like section and having a shaft extending through one wall into the interior thereof, and gearing between said rotor and the inner end of said distributer shaft.

13. In combination, an end plate for the crank case of an engine, a field magnet supported by said end plate, a rotor supported by said end plate and having a plurality of outwardly turned polar projections having polar faces arranged to pass successively between the poles of said field magnet during the rotation of the rotor, a stator supported from said end plate and having a plurality of inwardly turned polar projections with polar faces coöperating with the polar faces of said rotor, and a generating winding in inductive relation to one of the polar projections of said stator.

14. In combination, a section of an engine casing, a rotor mounted in said section and having a plurality of polar faces, a stator supported from said section of the engine casing and having a plurality of polar projections with polar faces disposed to coöperate with the polar faces of said rotor, a generating winding on one of said polar projections, and a field magnet supported by said section of the engine casing and having its poles disposed in inductive relation to said rotor and stator, the polar faces of said rotor and said polar projections being shaped and disposed alternately to establish, during the operation of said rotor, a path for the flux between said poles first through and then outside said generating winding.

15. In combination, a section of an engine casing, a rotor having a plurality of polar faces, a stator having a plurality of polar projections with polar faces disposed to coöperate with the polar faces of said rotor, said rotor and stator being supported by and removable with said section of the engine casing as a unit, a generating winding on said stator, a permanent magnet having its poles in inductive relation to said rotor and stator, and circuit closing and opening mechanism for said generating winding actuated by said rotor.

16. In a machine of the class described, a stator and a rotor co-axially disposed, each having a plurality of polar projections with coöperating polar surfaces disposed in planes at right angles to said axis, a generating winding carried by one of said polar projections, a circuit breaker mounted on said stator, a cam at the inner side of said rotor for actuating said circuit breaker, and a field magnet structure embracing said rotor and stator.

17. A machine of the class described, including a rotary unwound inductor, a fixed field magnet energizing said rotary inductor, a pole structure having a plurality of polar projections angularly adjustable about the axis of said inductor and arranged entirely between the polar faces of said inductor and one of the poles of said field magnet, a generating winding carried by one of said polar projections and adapted to be acted upon by unidirectional flux passing through said polar projection, and a circuit breaker and condenser mounted on said pole structure and adjustable with said polar projections.

In testimony whereof I affix my signature, in the presence of two witnesses.

LEON J. LE PONTOIS.

Witnesses:
JOHN C. BARKLEY,
EDWARD R. ALEXANDER.